(12) United States Patent
Sherman

(10) Patent No.: US 6,596,177 B2
(45) Date of Patent: Jul. 22, 2003

(54) METHOD OF IMPROVING THE QUALITY OF DIESEL FUEL

(75) Inventor: Jeffrey H. Sherman, The Woodlands, TX (US)

(73) Assignee: GRT, Inc., The Woodlands, TX (US)

( * ) Notice: Subject to any disclaimer, the term of this patent is extended or adjusted under 35 U.S.C. 154(b) by 0 days.

(21) Appl. No.: 10/082,853

(22) Filed: Feb. 25, 2002

(65) Prior Publication Data

US 2002/0079272 A1 Jun. 27, 2002

Related U.S. Application Data

(63) Continuation of application No. 09/735,565, filed on Dec. 12, 2000, now abandoned, which is a continuation-in-part of application No. 09/418,445, filed on Oct. 15, 1999, now Pat. No. 6,251,289, which is a continuation-in-part of application No. 09/325,503, filed on Jun. 3, 1999, now Pat. No. 6,103,130.

(51) Int. Cl.[7] .................................................. C02F 1/72
(52) U.S. Cl. ........................ 210/758; 250/758; 250/759
(58) Field of Search ................................. 210/758, 760; 208/208 R; 585/800

(56) References Cited

U.S. PATENT DOCUMENTS

| | | | |
|---|---|---|---|
| 3,310,380 A | 3/1967 | Lester | |
| 3,847,800 A | 11/1974 | Guth et al. | |
| 4,485,007 A | 11/1984 | Tam et al. | |
| 4,494,961 A | 1/1985 | Venkat et al. | |
| 4,643,820 A | 2/1987 | Zarrineghbal et al. | |
| 5,122,312 A | 6/1992 | Tomalesky | 261/122 |
| 5,151,187 A | 9/1992 | Behmann | 210/607 |
| 5,152,888 A | 10/1992 | Koyama | 210/195.3 |
| 5,156,173 A | 10/1992 | Keyser et al. | 134/61 |
| 5,271,810 A | 12/1993 | Keyser et al. | 202/185.2 |
| 5,316,682 A | 5/1994 | Keyser et al. | 210/649 |
| 5,510,544 A * | 4/1996 | Keyser | |
| 5,658,458 A * | 8/1997 | Keyser et al. | |
| 5,690,482 A | 11/1997 | Shessel et al. | |
| 5,855,775 A * | 1/1999 | Kerfoot | |
| 5,868,945 A | 2/1999 | Morrow et al. | 210/760 |
| 5,910,440 A | 6/1999 | Grossman et al. | |
| 6,274,785 B1 * | 8/2001 | Gore | |
| 6,368,495 B1 * | 4/2002 | Kocal et al. | |

* cited by examiner

*Primary Examiner*—Betsey Morrison Hoey
(74) *Attorney, Agent, or Firm*—Michael A. O'Neil

(57) ABSTRACT

In a method of improving the quality of diesel fuel, an oxidizing gas is formed into sub-micron size bubbles which are dispersed into diesel fuel, after which the treated fuel is recovered. The oxidizing gas is preferably ozone and is utilized immediately upon its manufacture. By means of the method, sulfur is removed from the diesel fuel and the cetane rating thereof is increased.

10 Claims, 6 Drawing Sheets

METHOD OF IMPROVING THE QUALITY OF DIESEL FUEL

CROSS REFERENCE TO RELATED APPLICATION

This application is a continuation-in-part of application Ser. No. 09/418,445 filed Oct. 15, 1999, now U.S. Pat. No. 6,251,289, which is a continuation-in-part of application Ser. No. 09/325,503 filed Jun. 3, 1999, now U.S. Pat. No. 6,103,130, which is a Continuation of Ser. No. 09/735,565 filed Dec. 12, 2000 now ABN.

TECHNICAL FIELD

This invention relates generally to the treatment of contaminated liquids with oxidizing gases, and more particularly to a method of improving the quality of diesel fuel by removing sulfur compounds therefrom and raising the cetane number thereof.

BACKGROUND AND SUMMARY OF THE INVENTION

Domestic diesel fuel contains, at most, 0.05% sulfur by weight. Refineries produce diesel fuel as a distillate of crude oil which is then hydrotreated to reduce the sulfur content to 0.05% or less. In hydrotreating, a reducing process, the diesel fuel is contacted with high pressure hydrogen gas in the presence of a solid catalyst. The catalyst serves to remove the sulfur in the form of sulfide, while the hydrogen serves to saturate the molecules from which the sulfur is removed.

While hydrotreating is effective at reducing the sulfur content of diesel fuels substantially, certain forms or sulfur are easier to remove then others. For example, sulfur in the form of sulfide is easier to remove than sulfur in the thiophene form. As a result, the sulfur that remains in diesel fuel after hydrotreating is mostly in the thiophene form. As thiophenes increase in complexity, the sulfur becomes more difficult to remove, requiring hydrotreating at more severe conditions. The higher the severity of the hydrotreating process, the shorter catalyst life time. Additionally, severe hydrotreating conditions lead to cracking of the diesel fuel molecules and thus higher yield losses. The sulfur remaining in diesel fuel after hydrotreating is primarily or exclusively in the thiophene form. Thiophenes reduced during the hydrotreating process are converted to biphenyl derivatives.

Recently, the United States Environmental Protection Agency (EPA) promulgated regulations sharply reducing the allowed sulfur content of diesel fuels. No later than year 2006, diesel fuel must contain less than 15 ppm sulfur (0.0015% by weight). This standard will require hydrotreating under conditions of increased severity.

Diesel fuel quality is rated by cetane number, a parameter similar to the octane rating number for gasoline. The higher the cetane number, the higher the quality of the diesel fuel. One class of compounds that contributes to a low cetane number are aromatics, including biphenyl derivatives. Thus, when hydrotreating is used to remove sulfur from diesel fuel, thiophenes are converted to biphenyl derivatives and the cetane number of the fuel is reduced.

In accordance with the present invention, sulfur in diesel fuel is oxidized to a sulfoxide or a sulfone. Once in the sulfoxide or sulfone form, the sulfur-containing molecule is easily removed from the diesel fuel by distillation or extraction. In contrast to hydrotreating, oxidative desulfurization and the subsequent removal of the molecules containing the oxidized sulfur results in a decrease in aromatic content. The decrease in aromatic content leads directly to an increase in cetane number.

In accordance with the one aspect of the invention, oxidizing gas is utilized at its source and is formed into sub-micron size bubbles which are immediately dispersed into flowing diesel fuel. Due to the sub-micron size of the bubbles, the surface area of the oxidizing gas is greatly increased, thereby greatly increasing the efficiency of the oxidation reaction.

In accordance with another aspect of the invention, the oxidizing gas is formed into sub-micron size bubbles by directing it through a sintered glass, sintered ceramic, or porous ceramic tube. Diesel fuel is caused to flow past the exterior of the sintered/porous tube. The flowing diesel fuel cleaves sub-micron size bubbles of the oxidizing gas from the surface of the tube. The sub-micron size bubbles of oxidizing gas are dispersed into the diesel fuel, whereupon sulfur compounds contained within the diesel fuel are efficiently oxidized into sulfoxides or sulfones, which are in turn removed by distillation or extraction.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
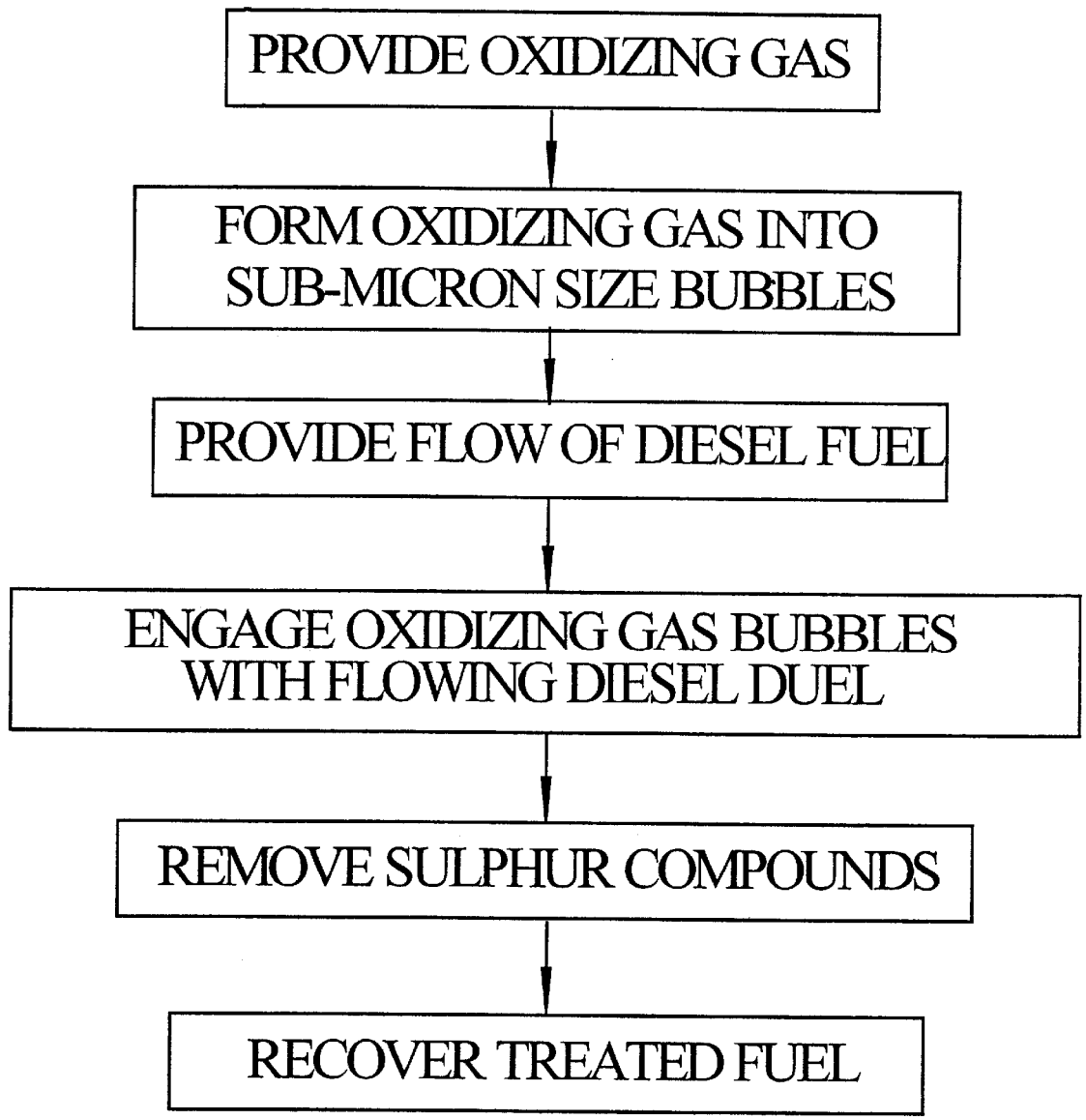
FIG. 1 is a flow chart illustrating a first embodiment of the invention.

Referring now to the Drawings, and particularly to FIG. 1 thereof, there is shown a method of improving the quality of diesel fuel comprising the preferred embodiment of the invention. The first step of the method comprises the manufacture of an oxidizing gas utilizing conventional and well known techniques. The oxidizing gas preferably comprises ozone, however, other oxidizing gases may be utilized in the practice of the invention, if desired. Immediately upon its manufacture, the selected oxidizing gas is formed into sub-micron size bubbles.

A quantity of diesel fuel having organic contaminants contained therein, such as compounds of sulfur, is caused to flow into engagement with the sub-micron size bubbles of oxidizing gas. The oxidizing gas bubbles are dispersed into the diesel fuel whereupon the sulfur compounds contained within the oil are immediately oxidized, thereby forming sulfoxides and/or sulfones. The sub-micron size of the bubbles of the oxidizing gas greatly increases the surface area of the oxidizing gas/diesel fuel interface thereby substantially increasing the efficiency of the oxidizing reaction. Upon completion of the oxidation reaction, the sulfoxides and/or sulfones are removed from the diesel fuel by distillation or extraction.

Figure 2:
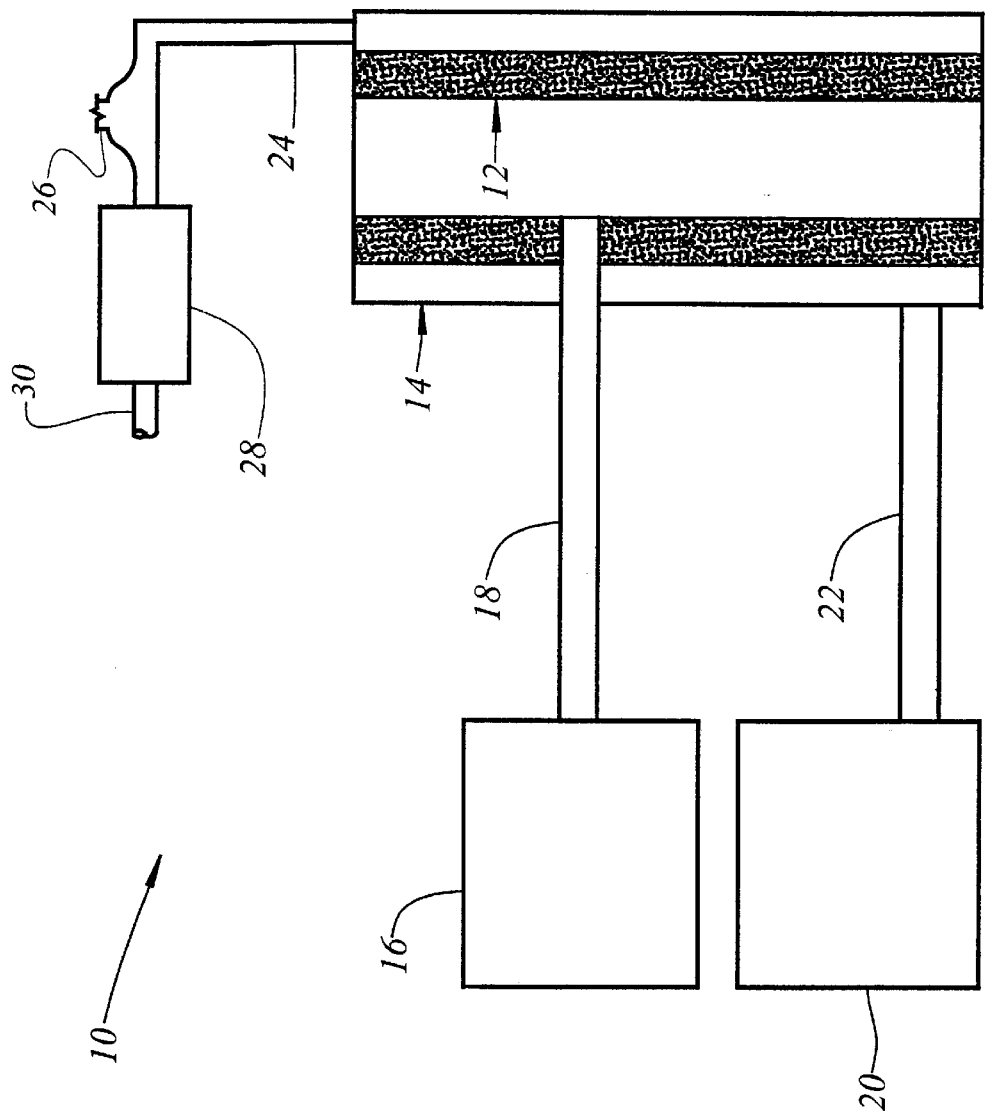
FIG. 2 is a diagrammatic illustration of a first apparatus useful in the practice of the method of the invention.

Referring to FIG. 2 there is shown an apparatus 10 which may be utilized in the practice in the method of the invention. The apparatus 10 includes a hollow tube 12 formed from sintered glass, sintered ceramic, or porous ceramic. Those skilled in the art will know and understand that other porous materials not subject to attack by oxidizing agents may be used in the practice of the invention. The sintered/porous tube 12 is positioned within a tank 14.

An oxidizing gas is manufactured within a source 16 utilizing conventional and well known techniques. The oxidizing gas is preferably ozone, however, other oxidizing gases may be utilized in the practice of the invention if desired. Immediately upon its manufacture the oxidizing gas from the source 16 is directed into the interior of the sintered/porous tube 12 through piping 18.

Meanwhile diesel fuel having sulfur compounds initially contained therein is caused to flow from a source 20 through piping 22 and the tank 14 to an outlet 24. The source 20 may comprise a conventional reservoir, tank, etc., which receives diesel fuel from one or more sources.

The pressure of the oxidizing gas within in the interior of the sintered/porous tube 12 is maintained high enough to prevent diesel fuel contained within the tank 14 from flowing inwardly through the tube 12 into the interior thereof. Rather, oxidizing gas flows outwardly from the interior of the tube 12 and is formed into sub-micron size bubbles which are cleaved from the exterior surface of the sintered glass, sintered ceramic, or porous ceramic tube 12 by, and are dispersed in the flowing diesel fuel.

As the diesel fuel from the source 20 flows through the tank 14, it passes over the exterior surface of the sintered/porous tube 12 thereby cleaving the sub-micron size bubbles of oxidizing gas from the exterior surface thereof. The sub-micron sized bubbles of oxidizing gas are immediately dispersed throughout the flowing fuel, whereupon organic contaminants contained within the diesel fuel are immediately oxidized into sulfoxides and/or sulfones. It will be appreciated that because of the sub-micron size of the bubbles comprising the oxidizing gas the surface area of the interface between the oxidizing gas and the diesel fuel is greatly increased, thereby greatly increasing the efficiency of the oxidizing reaction.

It is contemplated that all of the oxidizing gas will be consumed by the oxidizing reaction. If not, excess oxidizing gas may be recovered from the diesel fuel through an outlet 26 and properly disposed of. The diesel fuel is then directed to an apparatus 28 wherein the sulfoxides and/or sulfones which were formed during the oxidation reaction are removed from the diesel fuel either by distillation or by extraction.

Figure 3:
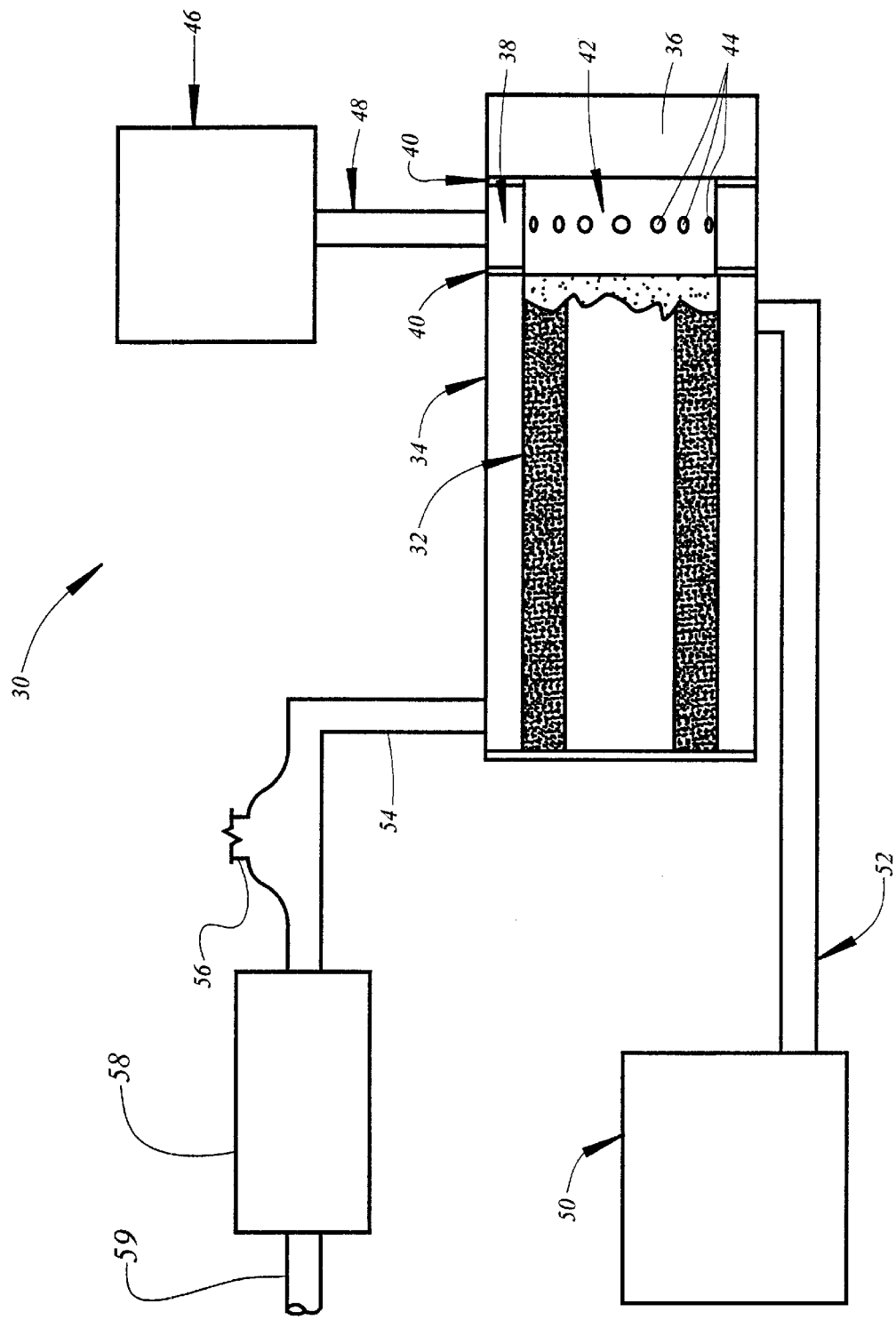
FIG. 3 is a diagrammatic illustration of a second apparatus useful in the practice of the method of the invention.

An alternative apparatus 30 which may be utilized in the practice of the method of the invention is illustrated in FIG. 3. The apparatus 30 includes a sintered glass, sintered ceramic, or porous ceramic tube 32 having a hollow interior which is supported within a tank 34 for rotation about its longitudinal axis. A motor 36 is positioned at one end of the tank 34 and is operatively connected to the tube 32 to effect rotation thereof relative to the tank 34. An annulus 38 is located at one end of the tank 34 and is separated from the tank 34 and from the motor 36 by seals 40. A collar 42 connects the annulus 38 to the interior of the sintered/porous tube 32 through a plurality of passageways 44.

In the operation of the apparatus 30 an oxidizing gas is manufactured within a source 46 utilizing conventional and well known techniques. The oxidizing gas is preferably ozone and, however, other oxidizing gases may be utilized in the practice of the invention. Immediately upon its manufacture the oxidizing gases directed into the annulus 38 through piping 48. From the annulus 38 the oxidizing gas flows into the interior of the sintered glass, sintered ceramic, or porous ceramic tube through the passageways 44 of the collar 42.

Diesel fuel received from a source 50. The source 50 may comprise a conventional reservoir or tank which receives the diesel fuel from one or more sources.

Diesel fuel continuously flows from the source 50 through piping 52 and through the tank 34 to an outlet 54. The pressure of the oxidizing gas within the hollow interior of the tube 32 is maintained sufficiently high that diesel fuel flowing through the tank 34 does not flow inwardly through the tube 32 into the interior thereof. Rather, oxidizing gas from the source 46 flows outwardly from the interior of the sintered or porous tube 32 to the outer surface thereof.

The outwardly flowing oxidizing gas accumulates on the exterior surface of the sintered tube 32 in the form of sub-micron size bubbles. The sub-micron size bubbles of oxidizing gas are immediately cleaved from the exterior surface of the sintered tube by the flow of the diesel fuel over the exterior surface of the sintered/porous tube 32. The sub-micron sized bubbles are dispersed throughout the flowing diesel fuel whereby the sulfur compounds initially contained within the flowing diesel fuel are immediately oxidized into sulfoxides and/or sulfones. The sub-micron size of the bubbles of the oxidizing gas greatly increases the size of the interface between the oxidizing gas and the initially contaminated liquid, thereby greatly increasing the efficiency of the oxidation reaction.

Treated diesel fuel is recovered through the outlet 54. It is contemplated that all of the oxidizing gas will be consumed by the oxidizing reaction. If not, excess oxidizing gas may be recovered from the treated liquid through an outlet 56 and thereafter properly disposed of. The diesel fuel flows into an apparatus 58 wherein the sulfoxides and/or sulfones formed by the oxidation reaction are removed by distillation or extraction. The treated diesel fuel is recovered at outlet 59.

Figure 4:
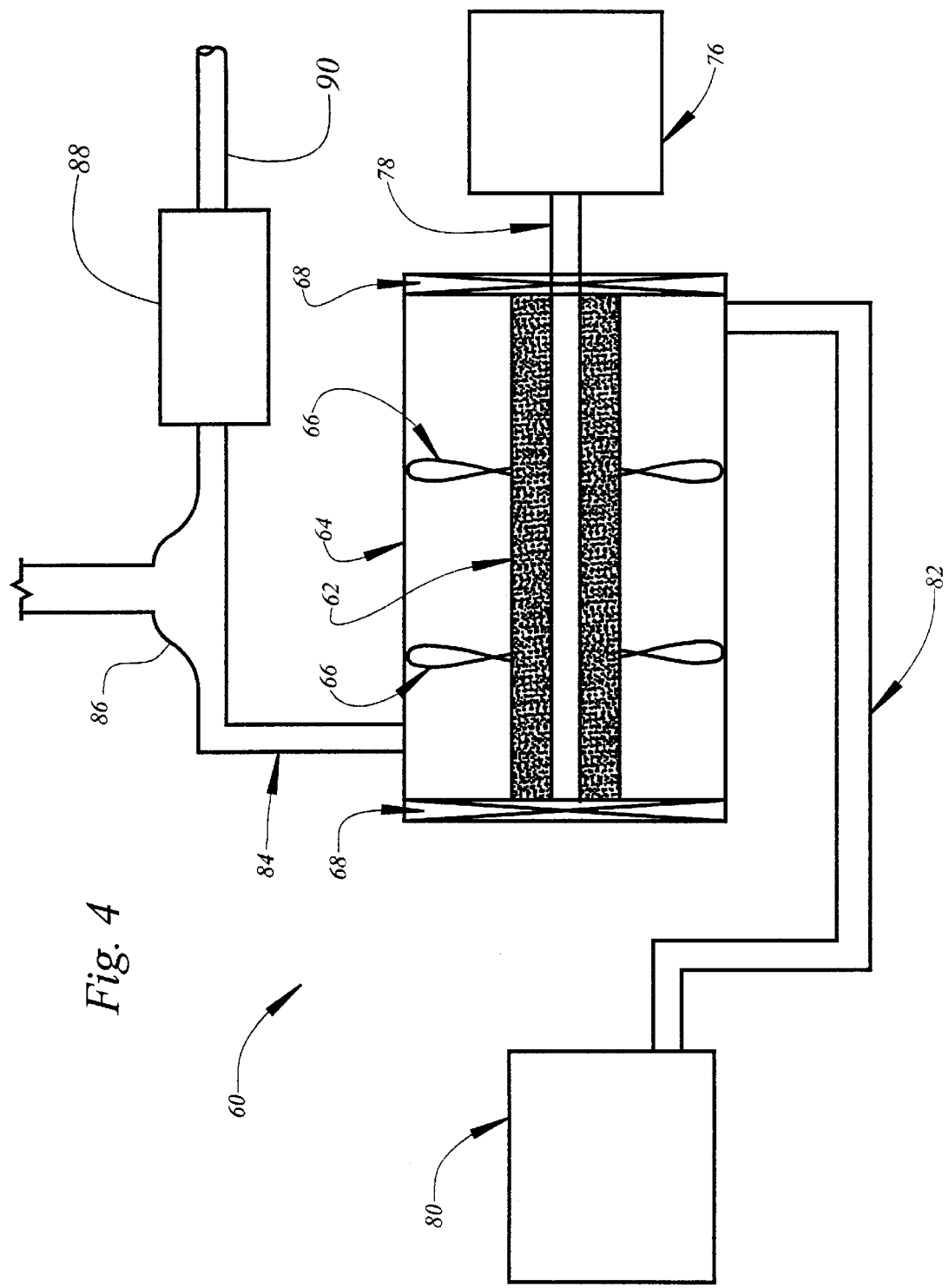
FIG. 4 is a diagrammatic illustration of a third apparatus useful in the practice of the method of the invention.

In the operation of the apparatus 30 shown in FIG. 4, the exterior surface of the tube 32 is rotated relative to the diesel fuel flowing through the tank 34 under the action of the motor 36. By this means the relative movement between the exterior surface of the tube 32 and the diesel fuel flowing through the tank 34 is greatly increased. This in turn increases the number of sub-micron sized bubbles of oxidizing gas which is dispersed into the flowing liquid, thereby increasing the efficiency of the oxidation reaction.

An alternative apparatus 60 which may be utilized in the practice of the method of the invention is illustrated in FIG. 4. The apparatus 60 includes a sintered glass, sintered ceramic, or porous ceramic tube 62 having a hollow interior which is supported within a tank 64 for rotation about its longitudinal axis. One or more turbines 66 are mounted on the sintered/porous tube 62 to effect rotation thereof relative to the tank 64.

In the operation of the apparatus 60 an oxidizing gas is manufactured within a source 76 utilizing conventional and well known techniques. The oxidizing gas is preferably ozone, however, other oxidizing gases may be utilized in the practice of the invention. Immediately upon its manufacture the oxidizing gas is directed into the interior of the sintered or porous tube 62.

Diesel fuel as received from a source 80. The source 80 may comprise a conventional reservoir or tank which receives the diesel fuel from one or more sources.

Diesel fuel continuously flows from the source 80 through piping 82 and through the tank 64 to an outlet 84. The pressure of the oxidizing gas within the hollow interior of the tube 62 is maintained sufficiently high that diesel fuel flowing through the tank 64 does not flow inwardly through the tube 62 into the interior thereof. Rather, oxidizing gas from the source 76 flows outwardly from the interior of the tube 62 to the outer surface thereof.

The outwardly flowing oxidizing gas accumulates on the exterior surface of the sintered/porous tube 62 in the form of sub-micron size bubbles. The sub-micron size bubbles of oxidizing gas are immediately cleaved from the exterior surface of the sintered tube by the flow of the diesel fuel over the exterior surface of the tube 62. The sub-micron sized bubbles are dispersed throughout the flowing diesel fuel whereby the sulfur compounds initially contained within the flowing diesel fuel are immediately oxidized into sulfoxides and/or sulfones. The sub-micron size of the bubbles of the oxidizing gas greatly increases the size of the interface between the oxidizing gas and the initially contaminated liquid, thereby greatly increasing the efficiency of the oxidation reaction.

Treated diesel fuel is recovered through the outlet 84. It is contemplated that all of the oxidizing gas will be consumed by the oxidizing reaction. If not, excess oxidizing gas may be recovered from the treated liquid through an outlet 86 and thereafter properly disposed of. The diesel fuel flows into an apparatus 88 wherein the sulfoxides and/or sulfones formed by the oxidation reaction are removed by distillation or extraction. The treated diesel fuel is recovered at outlet 90.

Figure 5:
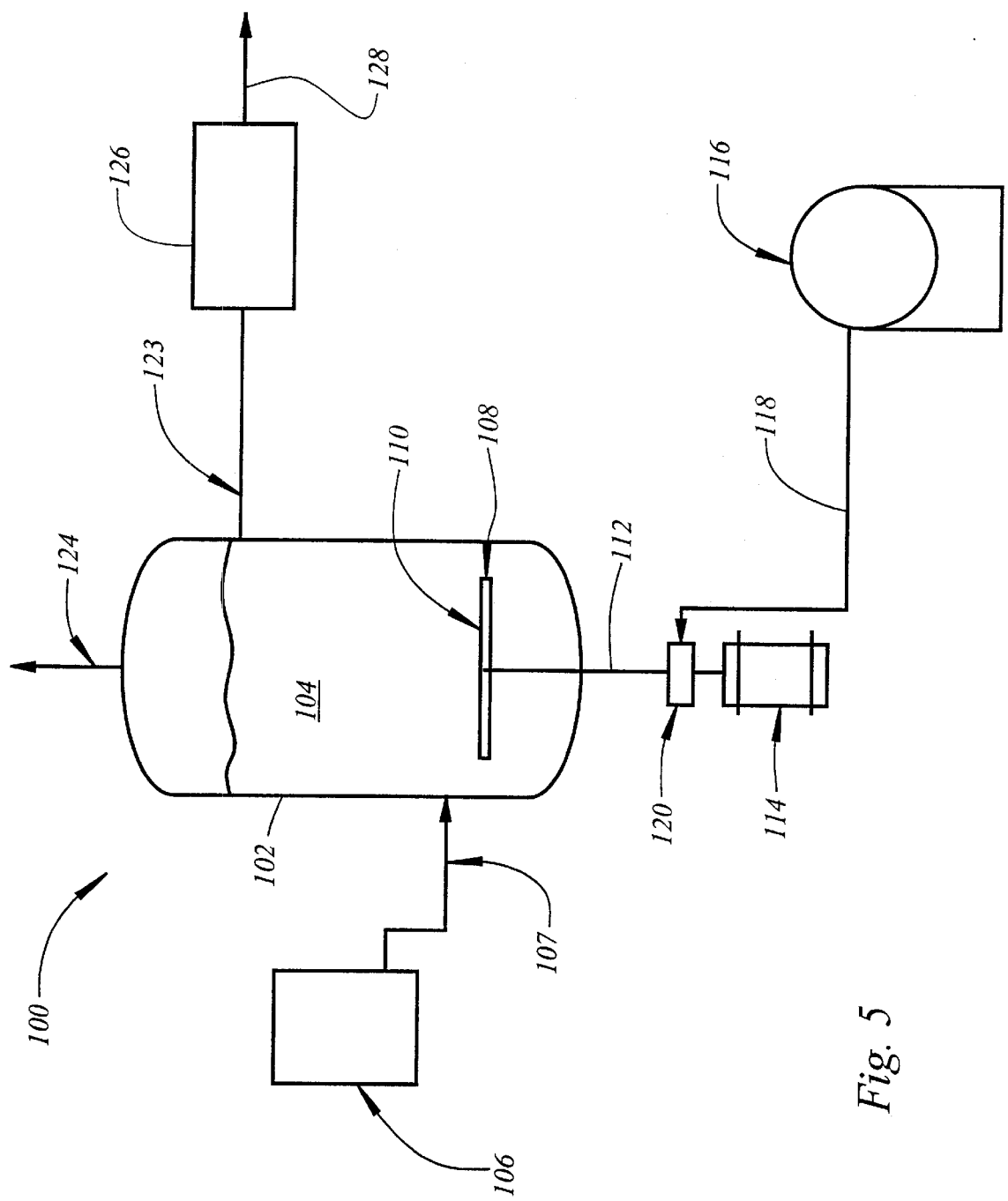
FIG. 5 is a diagrammatic illustration of a second embodiment of the invention.

In the operation of the apparatus 60 shown in FIG. 5 the exterior surface of the sintered/porous tube 62 is rotated relative to the fuel flowing through the tank 64 under the action of the turbines 66. By this means the relative movement between the exterior surface of the sintered tube 62 and the diesel fuel flowing through the tank 64 is greatly increased. This in turn increases the number of sub-micron sized bubbles of oxidizing gas which are dispersed into the flowing diesel fuel, thereby increasing the efficiency of the oxidation reaction.

Those skilled in the art will appreciate the fact that the use of the apparatus 30 shown in FIG. 3 or the apparatus 60 shown in FIG. 4 provides certain advantages with respect to the use of the apparatus shown in FIG. 2 in the practice of method of the invention. When the apparatus 30 of FIG. 3 is utilized, the relative movement between the exterior surface of the sintered/porous tube 32 and the diesel fuel flowing through the tank 34 depends upon the operation of the motor 36 rather than the flow rate of the liquid. This allows a greater number of sub-micron size bubbles of oxidizing gas to be dispersed into the diesel fuel than would be possible if the cleaving of sub-microns sized bubbles of oxidizing gas from the exterior surface of the tube 32 depended upon the flow of fuel alone. In this manner the efficiency of the oxidation reaction can be further increased.

When the apparatus 60 of FIG. 4 is utilized, the relative movement between the exterior surface of the sintered/porous tube 62 and the diesel fuel flowing through the tank 34 is greatly increased by the operation of the turbines 66. This allows a greater number of sub-micron size bubbles of oxidizing gas to be dispersed into the diesel fuel than would be possible if the cleaving of sub-microns sized bubbles of oxidizing gas from the exterior surface of the tube 62 depended upon the flow of fuel alone. In this manner the efficiency of the oxidation reaction can be further increased.

Figure 6:
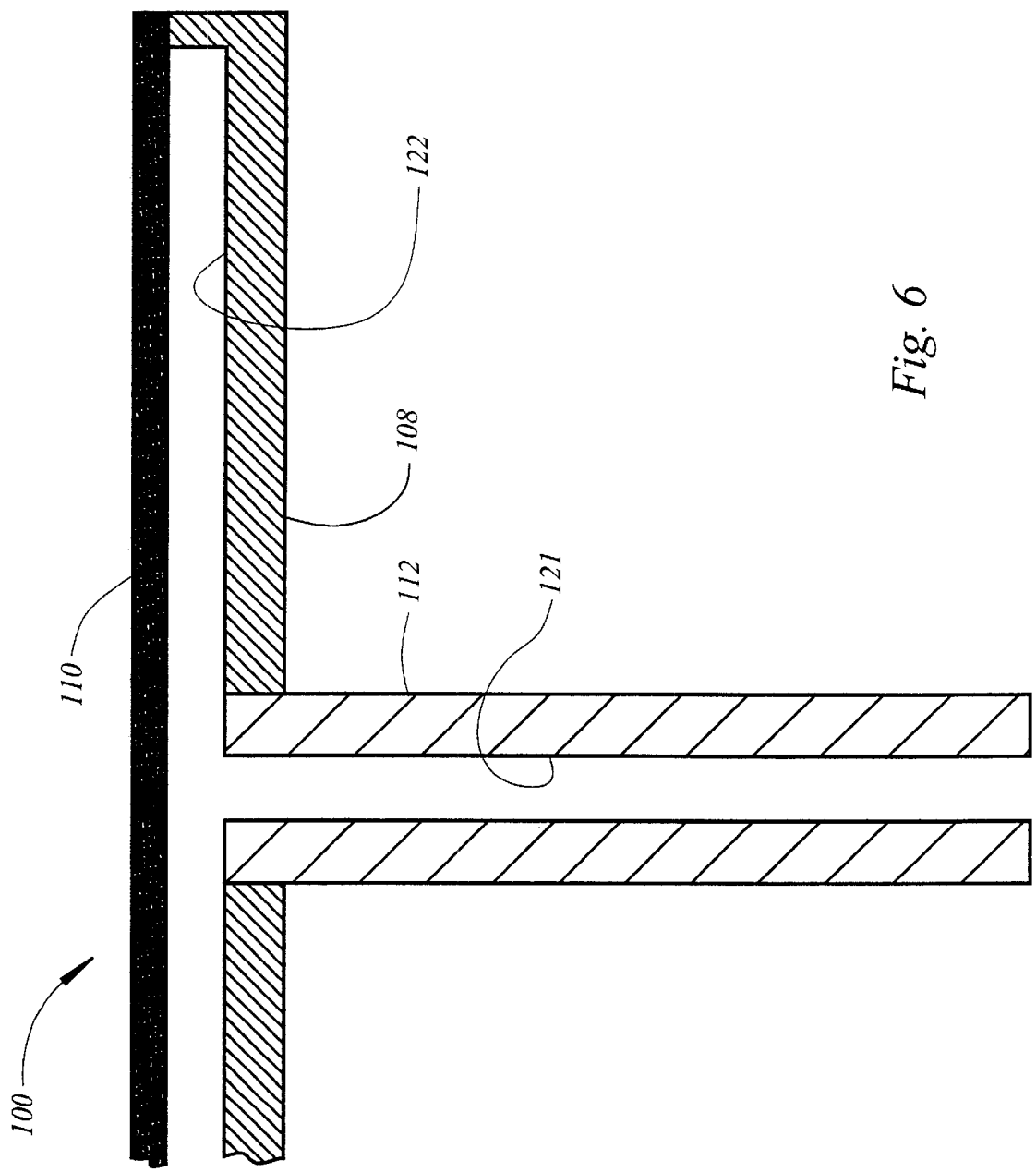
FIG. 6 is a further illustration of the embodiment of FIG. 5.

Referring now to FIGS. 5 and 6, there is shown a method of and apparatus for improving the quality of diesel fuel 100 comprising a second embodiment of the invention. In accordance with a second embodiment of the invention, there is provided a tank 102 having a quantity of diesel fuel 104 contained therein. The diesel fuel is supplied to the tank 102 from a source 106 through piping 107.

A hollow disk 108 is mounted in the lower portion of the tank 102. As is best shown in FIG. 6, the disk 108 includes a gas permeable partition 110 supported on a tube 112 for rotation within the tank 102 under the operation under the motor 114. The partition 10 may comprise sintered glass, sintered ceramic, or porous ceramic materials depending upon the requirements of particular applications of the invention. Oxidizing gas received from a supply 116 is directed through piping 118 and a suitable commutator 120 into the tube 112 and through the tube 112 into the interior of the hollow disk 108. The tube 112 has a hollow interior 121 and the disk 108 has a hollow interior 122 connected in fluid communication therewith.

The disk 108 is supplied with oxidizing gas at a pressure just high enough to overcome the head pressure of the water or other liquid 104. The disk 108 is rotated by the motor 114 at an appropriate speed in contact with the diesel fuel 104 such that a shearing phenomen occurs at the surface of the gas permeable partition 110 thus producing bubbles of extremely small, i.e., sub-micron, size. The extreme small size of the bubbles thus produced results in a surface area to volume ratio of small bubbles which significantly improves the efficiency of the oxidation reaction, in particular because the required vertical height of the tank 102 and therefore the pressure of the gas is substantially reduced due to the slower movement of the small bubbles in the liquid. The oxidizing gas reacts with sulfur compounds in the diesel fuel to form sulfoxides and/or sulfones. Diesel fuel is recovered from the tank 102 through outlet 123 and any residual gas is recovered from the tank 102 through outlet 124. The diesel fuel is directed to an apparatus 126 wherein the sulfoxides and/or sulfones formed duration the oxidation reaction are removed either by distillation or by extraction. The treated diesel fuel is recovered at outlet 128.

The method of improving the quality of diesel fuel comprised in the present invention may be used either as the sole process for treating diesel fuel or in combination with existing hydrotreating techniques. The method of the present invention totally removes sulfur compounds from diesel fuel, thereby improving the cetane rating of the diesel fuel. In particular, when the method of the present invention is used subsequently to hydrotreating, the aromatic compounds which remain after the hydrotreating process are removed thereby increasing the cetane rating of the diesel fuel.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A method of removing sulfur compounds from diesel fuel comprising the steps of:

providing an oxidizing gas;

forming the oxidizing gas into sub-micron size bubbles;

providing a flow of diesel fuel;

dispersing the sub-micron size bubbles of oxidizing gas into the flowing diesel fuel thereby oxidizing the sulfur compounds initially contained within the diesel fuel into sulfoxides and/or sulfones;

removing the sulfoxides and sulfones from the diesel fuel; and recovering the treated diesel fuel.

2. The method of claim 1 wherein the oxidizing gas is ozone.

3. The method of claim 2 wherein at least part of the oxidizing gas is formed into sub-micron size bubbles and dispersed into the flowing diesel fuel immediately upon its manufacture.

4. The method according to claim 1 wherein:

the oxidizing gas is directed through sintered material to an exterior surface; and the flowing diesel fuel is directed across the exterior surface thereby cleaving sub-micron sized bubbles of oxidizing gas from the exterior surface.

5. The method according to claim 4 including the additional step of moving the exterior surface relative to the flowing diesel fuel.

6. A method of removing sulfur compounds from petroleum distillates comprising the steps of:

providing an oxidizing gas;

forming the oxidizing gas into sub-micron size bubbles;

providing a flow of a petroleum distillate;

dispersing the sub-micron size bubbles of oxidizing gas into the flowing petroleum distillate thereby oxidizing the sulfur compounds initially contained within the petroleum distillate into sulfoxides and/or sulfones;

removing the sulfoxides and sulfones from the petroleum distillate; and recovering the treated petroleum distillate.

7. The method of claim 6 wherein the oxidizing gas is ozone.

8. The method of claim 7 wherein at least part of the oxidizing gas is formed into sub-micron size bubbles and dispersed into the flowing petroleum distillate immediately upon its manufacture.

9. The method according to claim 6 wherein:

the oxidizing gas is directed through sintered material to an exterior surface; and the flowing petroleum distillate is directed across the exterior surface thereby cleaving sub-micron sized bubbles of oxidizing gas from the exterior surface.

10. The method according to claim 9 including the additional step of moving the exterior surface relative to the flowing petroleum distillate.

* * * * *

UNITED STATES PATENT AND TRADEMARK OFFICE
CERTIFICATE OF CORRECTION

PATENT NO. : 6,596,177 B2  Page 1 of 1
DATED : July 22, 2003
INVENTOR(S) : Jeffrey H. Sherman It is certified that error appears in the above-identified patent and that said Letters Patent is hereby corrected as shown below:

Title page,
Item [73], References Cited, U.S. PATENT DOCUMENTS, please add the following references:

-- 4,513,092    4/1985    Chu et al.
      5,087,786    2/1992    Nubel et al.
      6,452,058    9/2002    Schweizer et al. --

Column 1,
Line 4, replace "CROSS REFERENCE" with -- CROSS-REFERENCE --.
Line 34, replace "forms or sulfur" with -- forms of sulfur --.
Line 35, replace "remove then others" with -- remove than others --.

Column 2,
Line 4, replace "with the one aspect" with -- with one aspect --.
Line 45, replace "of diesel fuel" with -- of diesel fuel or other petroleum distillates --.

Column 3,
Line 11, replace "upon its manufacture" with -- upon its manufacture, --.
Line 20, replace "within in the interior" with -- within the interior --.

Signed and Sealed this

First Day of June, 2004

JON W. DUDAS
*Acting Director of the United States Patent and Trademark Office*